(12) United States Patent
Ryu et al.

(10) Patent No.: US 11,288,506 B2
(45) Date of Patent: Mar. 29, 2022

(54) REFRIGERATOR APPLIANCES AND METHODS FOR TRACKING STORED ITEMS

(71) Applicant: Haier US Appliance Solutions, Inc., Wilmington, DE (US)

(72) Inventors: Choon Jae Ryu, Prospect, KY (US); Michael Goodman Schroeder, Louisville, KY (US); Stephanos Kyriacou, Louisville, KY (US)

(73) Assignee: Haier US Appliance Solutions, Inc., Wilmington, DE (US)

( * ) Notice: Subject to any disclaimer, the term of this patent is extended or adjusted under 35 U.S.C. 154(b) by 202 days.

(21) Appl. No.: 16/582,158

(22) Filed: Sep. 25, 2019

(65) Prior Publication Data
US 2021/0089769 A1 Mar. 25, 2021

(51) Int. Cl.
*G06K 9/00* (2006.01)
*G06K 9/62* (2022.01)
*H04N 5/225* (2006.01)

(52) U.S. Cl.
CPC ....... *G06K 9/00624* (2013.01); *G06K 9/6201* (2013.01); *H04N 5/2253* (2013.01)

(58) Field of Classification Search
None
See application file for complete search history.

(56) References Cited

U.S. PATENT DOCUMENTS

| | | | |
|---|---|---|---|
| 9,547,851 B2 | 1/2017 | Brown | |
| 2016/0088262 A1 | 3/2016 | Lee et al. | |
| 2017/0039511 A1 | 2/2017 | Corona et al. | |
| 2018/0232689 A1* | 8/2018 | Minvielle | G06N 5/003 |
| 2019/0164116 A1* | 5/2019 | Wallace | G06Q 10/087 |

FOREIGN PATENT DOCUMENTS

| | | |
|---|---|---|
| JP | 2002115956 A | 4/2002 |
| KR | 101375906 B1 | 3/2014 |
| KR | 20180020214 A | 2/2018 |

* cited by examiner

*Primary Examiner* — James M Anderson, II
(74) *Attorney, Agent, or Firm* — Dority & Manning, P.A.

(57) ABSTRACT

A refrigerator appliance, as provided herein, may include a cabinet defining a chilled chamber, a door rotatably hinged to the cabinet, a camera module, and a controller. The camera module may be mounted to the cabinet. The controller may be operably coupled to the camera module. The controller may be configured to initiate an operation routine. The operation routine may include receiving a purchase invoice, initiating an item recognition sequence within the refrigerator appliance, generating an initial recognition attempt of a first stored item based on the item recognition sequence, comparing the initial recognition attempt of the first stored item to the purchase invoice, generating a modified recognition attempt of the first stored item based on the comparison of the initial recognition attempt the first stored item to the purchase invoice, and recording a descriptor of the first stored item to an inventory within the refrigerator appliance.

18 Claims, 4 Drawing Sheets

REFRIGERATOR APPLIANCES AND METHODS FOR TRACKING STORED ITEMS

FIELD OF THE INVENTION

The present subject matter relates generally to tracking items within a storage enclosure, such as a refrigerator appliance.

BACKGROUND OF THE INVENTION

Storage enclosures, such as refrigerator appliances and pantries, generally provide an enclosed chamber for receiving multiple items or objects. For example, refrigerator appliances generally include a cabinet that defines a chilled chamber. A user can place food items or objects within the chilled chamber in order to hinder perishing of such food items. Thereby, a useable life of perishable items or objects can be increased.

Over time, a large volume or number of stored items (e.g., food items) can accumulate within the refrigerator's chilled chamber. As stored items accumulate, users of the refrigerator appliance can have difficulty identifying the items located within the refrigerator appliance. Additionally, users can have difficulty determining a quantity of certain items within the refrigerator appliance. This is especially true when multiple users add/remove items from a common refrigerator appliance without communicating with other users. Consequently, the users may accidentally purchase excessive or undesired items. For example, certain food items do not readily perish within the chilled chamber, and such food items may be consumed infrequently. Thus, such food items can remain within the chilled chamber for extended periods of time. The users can forget about such food items and purchase replacements despite already having acceptable items. In such a manner, the users can be inconvenienced or expend money needlessly. Additionally or alternatively, some users may be unaware that certain items have been removed or consumed. Thus, users may fail to replace or replenish such items.

Some existing appliances have attempted to address these issues by requiring a user to manually input each item being stored. Other appliances have used various methods, such as scales, to estimate or guess the quantity or identification of items being stored. Nonetheless, such attempts have been insufficiently cumbersome and prone to inaccuracies. These drawbacks may be magnified if one or more items are left in a bag (e.g., grocery bag) when being stored within the appliance.

Accordingly, a refrigerator appliance with features for assisting a user with tracking contents of a chilled chamber of the refrigerator appliance would be useful. In particular, a refrigerator appliance with features for assisting a user with accurately tracking the contents of a chilled chamber of the refrigerator appliance in order to establish an inventory of stored items positioned within the chilled chamber would be useful.

BRIEF DESCRIPTION OF THE INVENTION

Aspects and advantages of the invention will be set forth in part in the following description, or may be obvious from the description, or may be learned through practice of the invention.

In one exemplary aspect of the present disclosure, a refrigerator appliance is provided. The refrigerator appliance may include a cabinet defining a chilled chamber, a door rotatably hinged to the cabinet, a camera module, and a controller. The camera module may be mounted to the cabinet. The controller may be operably coupled to the camera module. The controller may be configured to initiate an operation routine. The operation routine may include receiving a purchase invoice, initiating an item recognition sequence within the refrigerator appliance, generating an initial recognition attempt of a first stored item based on the item recognition sequence, comparing the initial recognition attempt of the first stored item to the purchase invoice, generating a modified recognition attempt of the first stored item based on the comparison of the initial recognition attempt the first stored item to the purchase invoice, and recording a descriptor of the first stored item to an inventory within the refrigerator appliance.

In another exemplary aspect of the present disclosure, a method of operating a refrigerator appliance is provided. The method may include receiving a purchase invoice and initiating an item recognition sequence within the refrigerator appliance. The method may further include generating an initial recognition attempt of a first stored item based on the item recognition sequence and comparing the initial recognition attempt of the first stored item to the purchase invoice. The method may still further include generating a modified recognition attempt of the first stored item based on the comparison of the initial recognition attempt the first stored item to the purchase invoice and recording a descriptor of the first stored item to an inventory within the refrigerator appliance.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures.

DETAILED DESCRIPTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope of the invention. For instance, features illustrated or described as part of one embodiment can be used with another embodiment to yield a still further embodiment. Thus, it is intended that the present invention covers such modifications and variations as come within the scope of the appended claims and their equivalents.

As used herein, the term "or" is generally intended to be inclusive (i.e., "A or B" is intended to mean "A or B or both"). The terms "first," "second," and "third" may be used interchangeably to distinguish one component from another and are not intended to signify location or importance of the individual components.

Generally, the present disclosure provides methods to aid in managing an inventory for food items within a storage enclosure, such as a refrigerator appliance or pantry. The methods may include one or more steps for determining what items (i.e., stored items) are added or removed from the storage enclosure. The determination may be made using information about what items a user has purchased, as well as information inferred by systems within the storage enclosure. Optionally, a user may confirm the inferences of the system.

Figure 1:
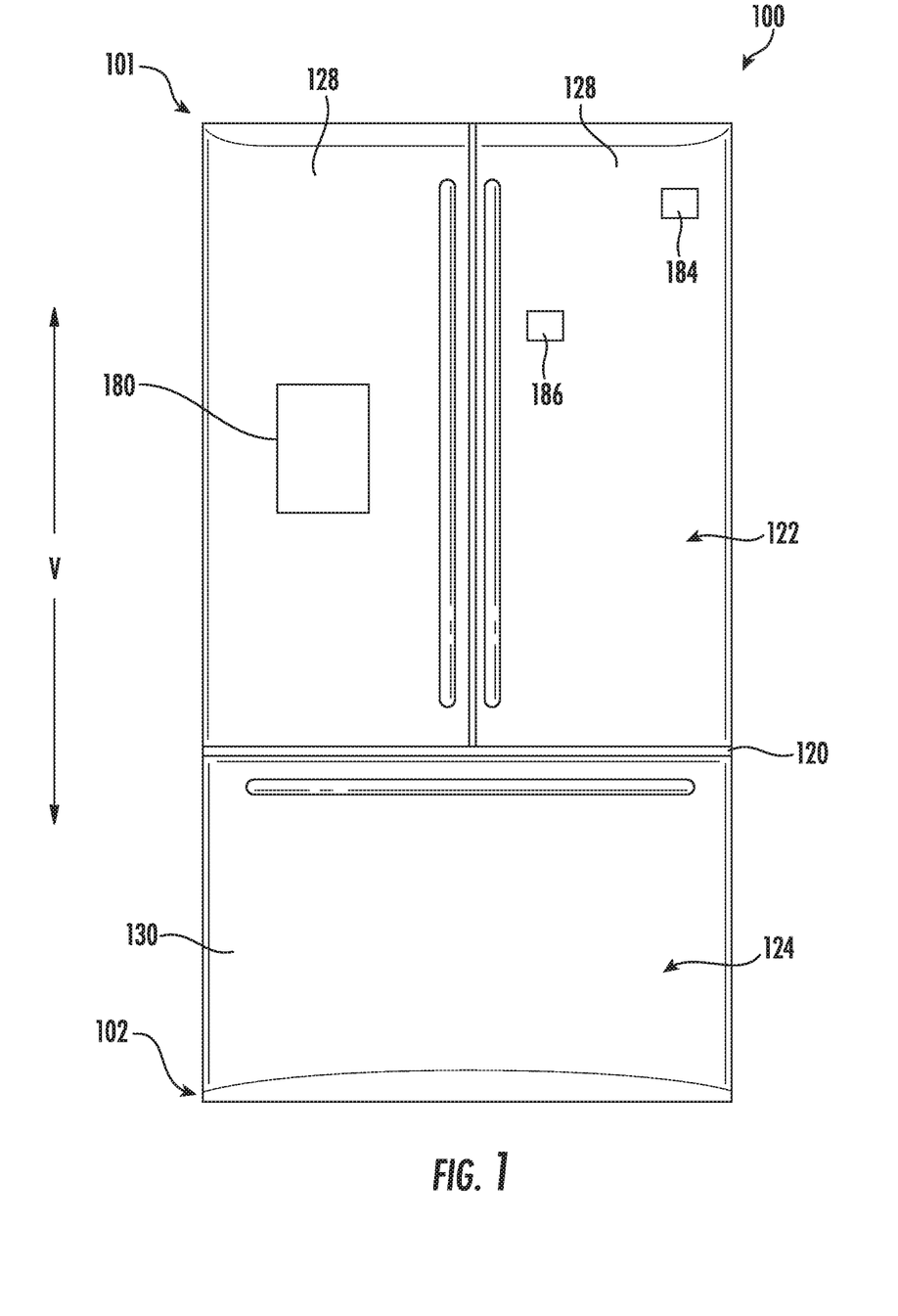
FIG. 1 provides a front elevation view of a refrigerator appliance according to exemplary embodiments of the present disclosure.
Figure 2:
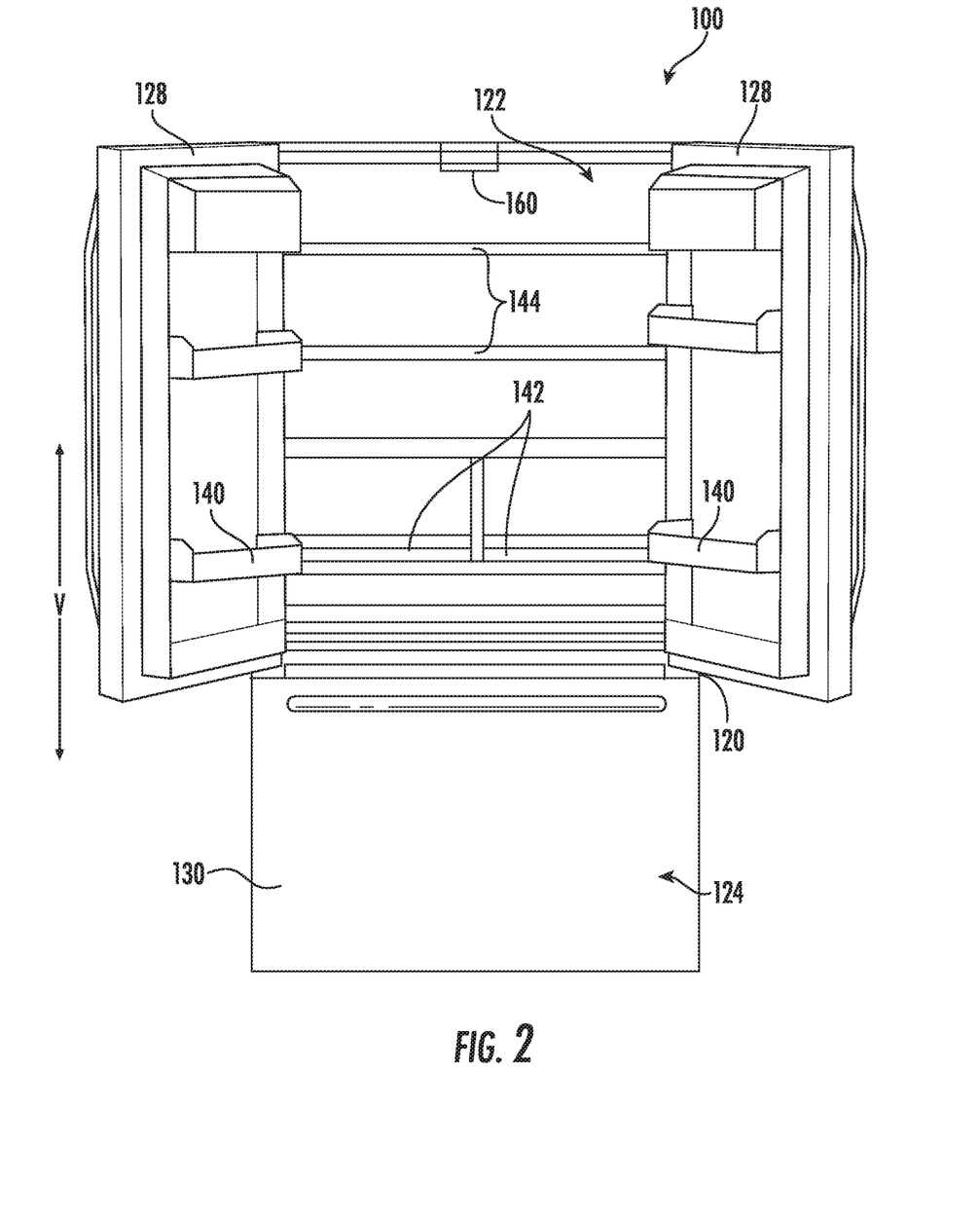
FIG. 2 provides a front elevation view of a refrigerator appliance according to exemplary embodiments of the present disclosure, wherein refrigerator doors are shown in an open position.

Turning now to the figures, FIG. 1 provides a front elevation view of a refrigerator appliance 100 according to exemplary embodiments of the present disclosure with refrigerator doors 128 of the refrigerator appliance 100 shown in a closed position. FIG. 2 provides a front view elevation of refrigerator appliance 100 with refrigerator doors 128 shown in an open position to reveal a fresh food chamber 122 of refrigerator appliance 100.

Refrigerator appliance 100 includes a housing or cabinet 120 that extends between a top 101 and a bottom 102 along a vertical direction V. Cabinet 120 defines chilled chambers for receipt of food items for storage. In particular, cabinet 120 defines fresh food chamber 122 positioned at or adjacent top 101 of cabinet 120 and a freezer chamber 124 arranged at or adjacent bottom 102 of cabinet 120. As such, refrigerator appliance 100 is generally referred to as a bottom mount refrigerator. It is recognized, however, that the benefits of the present disclosure apply to other types and styles of storage enclosure, such as a top mount refrigerator appliance, a side-by-side style refrigerator appliance, or an unrefrigerated pantry enclosure. Consequently, the description set forth herein is for illustrative purposes only and is not intended to be limiting in any aspect to any particular storage enclosure or refrigerator chamber configuration.

Refrigerator doors 128 are rotatably hinged to an edge of cabinet 120 for selectively accessing fresh food chamber 122. In addition, a freezer door 130 is arranged below refrigerator doors 128 for selectively accessing freezer chamber 124. Freezer door 130 is coupled to a freezer drawer 142 (not shown) slidably mounted within freezer chamber 124. As discussed above, refrigerator doors 128 and freezer door 130 are shown in the closed configuration in FIG. 1, and refrigerator doors 128 are shown in the open position in FIG. 2.

Turning now to FIG. 2, various storage components are mounted within fresh food chamber 122 to facilitate storage of food items therein as will be understood by those skilled in the art. In particular, the storage components include bins 140, drawers 142, and shelves 144 that are mounted within fresh food chamber 122. Bins 140, drawers 142, and shelves 144 are configured for receipt of stored items (e.g., beverages or solid food items) and may assist with organizing such food items. As an example, drawers 142 can receive fresh food items (e.g., vegetables, fruits, or cheeses) and increase the useful life of such fresh food items.

Refrigerator appliance 100 also includes features for assisting a user with identifying food items positioned within fresh food chamber 122 or freezer chamber 124. The user can utilize such features, for example, to view food items stored (i.e., stored items) within fresh food chamber 122 or freezer chamber 124 or create an inventory of such stored items. Such features are discussed in greater detail below.

Figure 3:
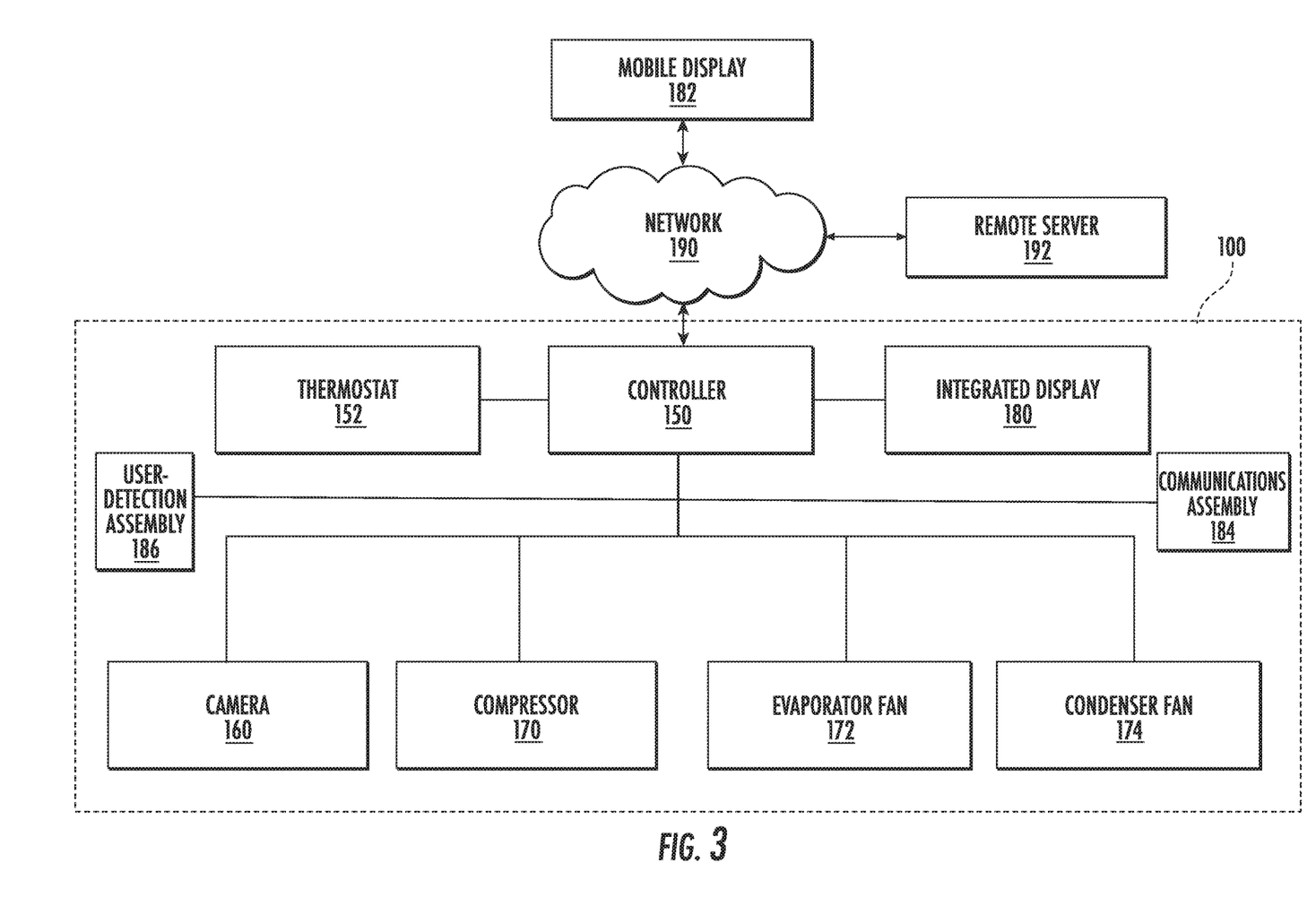
FIG. 3 provides a schematic view of a refrigerator appliance according to exemplary embodiments of the present disclosure.

FIG. 3 provides a schematic view of refrigerator appliance 100. Refrigerator appliance 100 includes a controller 150 that is operatively coupled or in communication with components of a refrigeration system (not shown) of refrigerator appliance 100 configured for cooling fresh food chamber 122 or freezer chamber 124. The components include a compressor 170, an evaporator fan 172, and a condenser fan 174. Controller 150 can selectively operate such components in order to cool fresh food chamber 122 or freezer chamber 124. Controller 150 is also in communication with a thermostat (e.g., a thermocouple or thermistor). The thermostat may be positioned in fresh food compartment 122 or freezer compartment 124 (FIG. 2). Controller 150 may receive a signal from the thermostat that corresponds to a temperature of fresh food compartment 122 or freezer compartment 124. Controller 150 may also include an internal timer for calculating elapsed time periods.

Controller 150 may include a memory and one or more microprocessors, CPUs or the like, such as general or special purpose microprocessors operable to execute programming instructions or micro-control code associated with operation of refrigerator appliance 100. The memory may represent random access memory such as DRAM, or read only memory such as ROM or FLASH. In some embodiments, the processor executes non-transitory programming instructions stored in memory. For certain embodiments, the instructions include a software package configured to operate appliance 100 or execute an operation routine (e.g., the exemplary method 400 described below with reference to FIG. 4). The memory may be a separate component from the processor or may be included onboard within the processor. Alternatively, controller 150 may be constructed without using a microprocessor (e.g., using a combination of discrete analog or digital logic circuitry; such as switches, amplifiers, integrators, comparators, flip-flops, AND gates, and the like) to perform control functionality instead of relying upon software.

Controller 150 may be positioned in a variety of locations throughout refrigerator appliance 100. Input/output ("I/O") signals may be routed between controller 150 and various operational components of refrigerator appliance 100. One or more components of refrigerator appliance 100 may be in communication (e.g., electric communication) with controller 150 via one or more conductive signal lines or shared communication busses. Additionally or alternatively, one or more components of refrigerator appliance 100 may be in communication (e.g., wireless communication) with controller 150 via one or more wireless signal bands.

In some embodiments, refrigerator appliance 100 also includes a camera or camera module 160. Camera 160 may be any type of device suitable for capturing a two-dimensional picture or image. As an example, camera 160 may be a video camera or a digital camera with an electronic image sensor [e.g., a charge coupled device (CCD) or a CMOS sensor]. When assembled, camera 160 is in communication (e.g., electric or wireless communication) with controller 150 such that controller 150 may receive a signal from camera 160 corresponding to the image captured by camera 160.

Generally, camera 160 is positioned on refrigerator appliance 100. In some embodiments, camera 160 is mounted within fresh food chamber 122 at a top portion thereof (e.g., adjacent top 101). For instance, camera 160 may be fixed to or directed through a top wall of an internal liner defining fresh food chamber 122. In such embodiments, camera 160 may be directed downward, as illustrated in FIG. 2.

In certain embodiments, is directed toward one or more chilled chamber (e.g., fresh food chamber 122—FIG. 2). For instance, camera 160 may be directed towards at least a portion of any particular one of or combination of drawers 142 and shelves 144 (FIG. 2). Thus, camera 160 can capture images of one of drawers 142, all of drawers 142, one of shelves 144, all of shelves 144, or any suitable combination thereof.

Although camera 160 is illustrated as being mounted within fresh food chamber 122, it is understood that additional or alternative embodiments include a camera assembly [e.g., digital camera with an electronic image sensor [e.g., a charge coupled device (CCD) or a CMOS sensor] mounted at another suitable portion of refrigerator appliance, such as a door 128. Such a camera assembly may be directed outward or in front of refrigerator appliance 100 and may thus capture images of a user or area positioned forward from refrigerator appliance 100 (e.g., when the corresponding door is in a closed position).

In certain embodiments, refrigerator appliance 100 includes an integrated display 180. Integrated display 180 may be mounted on refrigerator door 128 (FIG. 1) or at any other suitable location on refrigerator appliance 100. Integrated display 180 is in communication with controller 150 such that integrated display 180 may receive a signal from controller 150 corresponding to an image captured by camera 160. Integrated display 180 can receive such signal from controller 150 and present the image to a user visually. Integrated display 180 may include, for example, a liquid crystal display panel (LCD), a plasma display panel (PDP), or any other suitable mechanism for displaying an image (e.g., a projector).

Separate from or in addition to integrated display 180, refrigerator 100 may include a communications assembly 184 in communication with controller 150. Generally, communications assembly 184 may be mounted on any suitable portion of refrigerator 100, such as within cabinet 120 or a door 128. In certain embodiments, the communications assembly includes a loudspeaker (e.g., dynamic loudspeaker, electrostatic loudspeaker, planar magnetic loudspeaker, piezoelectric loudspeaker etc.). As is understood, the loudspeaker may be configured to generate soundwaves from one or more electrical signals (e.g., digital sound signals received from controller 150). The loudspeaker may thus audibly communicate information to a user. In additional or alternative embodiments, the communications assembly includes a microphone (e.g., dynamic microphone, ribbon microphone, fiber-optic microphone, piezoelectric microphone, etc.). As is understood, the microphone may generate one or more electrical signals (e.g., to be received by controller 150) from one or more received soundwaves (e.g., from a user). The microphone may thus receive audible prompts or commands from a user that can be directed to the controller 150.

In exemplary embodiments, refrigerator appliance 100 includes a network interface (not shown) that couples refrigerator appliance 100 (e.g., controller 150) to a network 190 such that refrigerator appliance 100 can transmit and receive information over network 190. Network 190 can be any wired or wireless network such as a WAN, LAN, or HAN.

In optional embodiments, refrigerator appliance 100 includes a user-detection assembly 186. Generally, user-detection assembly 186 includes one or more sensors configured to detect a biometric or personalized marker corresponding to a specific individual user. As an example, user-detection assembly 186 may include a forward-facing camera configured to recognize or identify a user's face based on a captured two-dimensional image. As another example, user-detection assembly 186 may include a fingerprint imaging sensor configured to visually detect a user's fingerprint. As yet another example, user-detection assembly 186 may include a signal-detection sensor configured to detect a device address over a wireless communications band (e.g., a BLE band using short-wavelength UHF radio waves in the ISM band from 2.4 to 2.485 GHz). The device address may be a programmed Bluetooth address of, for instance, mobile display 182. The user-detection assembly 186 may thus determine if and when a mobile display 182 is within close proximity to refrigerator appliance 100.

In certain embodiments, camera 160 is included as part of user-detection assembly 186. As an example, user-detection assembly 186 may be configured to recognize or identify a user from a two-dimensional image captured at camera 160. In some such embodiments, controller 150 is further configured to recognize one or more defining features below a user's elbow, such as skin tone, arm/hand size, jewelry, typical clothing, etc. As is understood, recognizing such defining features may be performed by edge matching, divide-and-conquer search, greyscale matching, histograms of receptive field responses, or another suitable routine (e.g., executed at the controller 150 based on one or more captured images from camera 160).

During use, such as during an image capture sequence, camera 160 may capture one or more two-dimensional images (e.g., as a video feed or series of sequential static images) that may be transmitted to the controller 150 (e.g., as a data signal), as is generally understood. Optionally, the image capture sequence may be initiated by a predetermined user action, such as opening a door 128, detected movement within a chilled chamber (e.g., fresh food chamber 122), engaging or moving within range of user-detection assembly 186, proving a user input at communications assembly 184 or integrated display 180, etc.

In some embodiments, one or more remote servers 192, such as a web server, is in operable communication with controller 150. The remote server 192 can be used to host a retailer's point of sale system. In other words, remote server 192 may be or include a retailer point of sale server that tracks, for example, an identifier and quantity of purchased items, a time or date stamp of purchased items, pricing of purchased items, a customer identifier (i.e., an identifier of the purchasing customer), etc. Additionally or alternatively, the remote server 192 can be used to host a retailer's stock management system. In other words, remote server 192 may include, or be provided as, a retailer stock management server that tracks, for example, stocking data relating to items offered for sale by a retailer (e.g., expiration data, location data, cost data, etc.). Also additionally or alternatively, the remote server 192 can be used to host one or more information databases.

The remote server 192 can be implemented using any suitable computing device(s). The remote server 192 may include one or more processors and one or more memory devices (i.e., memory). The one or more processors can be any suitable processing device (e.g., a processor core, a microprocessor, an ASIC, a FPGA, a microcontroller, etc.) and can be one processor or a plurality of processors that are operatively connected. The memory device can include one or more non-transitory computer-readable storage mediums, such as RAM, ROM, EEPROM, EPROM, flash memory devices, magnetic disks, etc., and combinations thereof. The memory devices can store data and instructions which are executed by the processor to cause remote server 192 to perform operations. For example, instructions could be instructions for receiving/transmitting point of sale data signals, receiving/transmitting inventory management data signals, receiving/transmitting data signals relating to a stored item, etc.

The memory devices may also include data, such as point of sale data, customer identification data, inventory data, expiration data, etc., that can be retrieved, manipulated, created, or stored by processor. The data can be stored in one or more databases. The one or more databases can be connected to remote server 192 by a high bandwidth LAN or WAN, or can also be connected to remote server 192 through network 502. The one or more databases can be split up so that they are located in multiple locales.

Remote server 192 includes a network interface such that remote server 192 can connect to and communicate over one or more networks (e.g., network 190) with one or more network nodes. In turn, remote server 192 can exchange data with one or more nodes over the network 190. In particular, remote server 192 can exchange data with controller 150. Although not pictured, it is understood that remote server 192 may further exchange data with any number of client devices over the network 190 (e.g., mobile display 182).

In certain embodiments, camera 160 and controller 150 are configured to capture multiple, sequential, two-dimensional images (e.g., at a predetermined rate or pattern) as part of an image capture sequence. Sequential images (e.g., a previously-captured image and a more-recently-captured image) may be recorded (e.g., temporarily) and compared at the controller 150. From the comparison, changes or differences between sequential images may be detected. Optionally, the image capture sequence may subsequently be stopped or halted according to one or more end conditions, such as expiration of a predetermined time period, failure to detect further changes in sequential images, or closing of the door 128.

From the captured images, controller 150 may automatically attempt to recognize items (e.g., stored items, such as food, or non-stored items such as a user appendage, a shelf, a movable drawer, etc.) within the field of view for the camera 160. As is understood, recognizing such items, may be performed by edge matching, divide-and-conquer search, greyscale matching, histograms of receptive field responses, or another suitable routine (e.g., executed at the controller 150 based on one or more captured images from camera 160). The recognition may include or attempt to estimate the identification (e.g., what type of food or object is recognized) or quantity (e.g., number of discrete units, volume, or mass) of the stored item. Optionally, a recognition score may be assigned to each recognized stored item. Generally, the recognition score provides a probability or likelihood that the recognition or estimate is correct. Based on additional data or confirmation (e.g., received from one or more remote servers 192), the recognition score may be updated or refined.

Figure 4:
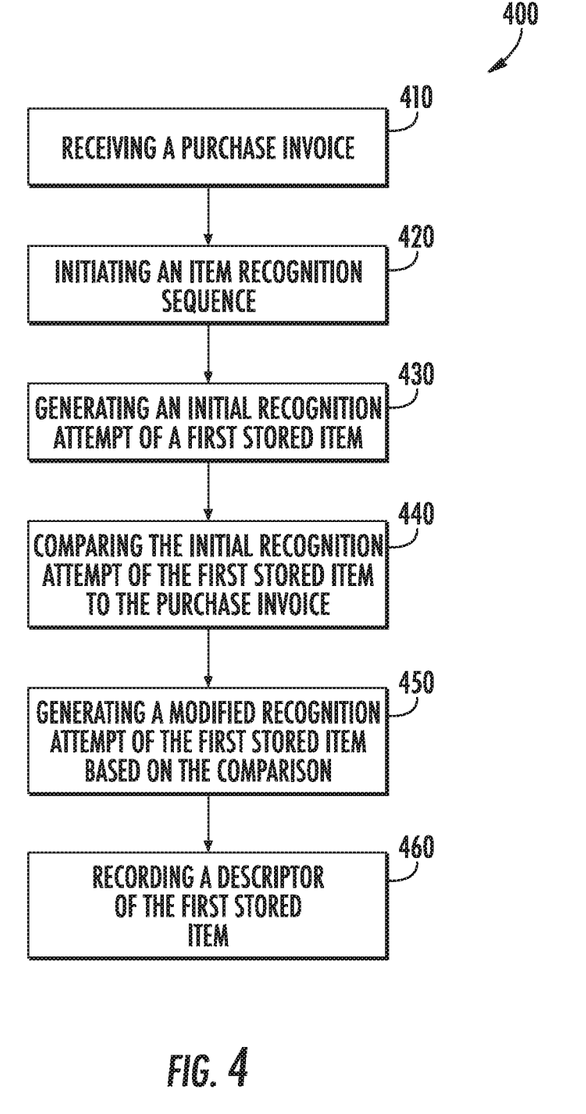
FIG. 4 provides a flow chart illustrating a method of operating a refrigerator appliance according to exemplary embodiments of the present disclosure.

Turning now to FIG. 4, a flow chart is provided of a method 400 according to exemplary embodiments of the present disclosure. Generally, FIG. 4 provides a method of operating a refrigerator appliance 100 (FIG. 1) that includes a camera 160, as described above. The method 400 can be performed, for instance, by the controller 150 (FIG. 3). For example, controller 150 may, as discussed, be in communication with camera 160, integrated display 180 (FIG. 3), mobile display 182 (FIG. 3), communications assembly 184, user-detection assembly 186, or remote server(s) 192. During operations, controller 150 may send signals to and receive signals from camera 160, integrated display 180, mobile display 182, communications assembly 184, user-detection assembly 186, or remote server(s) 192. Controller 150 may further be operatively coupled to other suitable components of the appliance 100 to facilitate operation of the appliance 100 generally.

Advantageously, methods in accordance with the present disclosure may permit improved detection of one or more items within, for example, a refrigerator appliance. Additionally or alternatively, detection may be made while reducing the processing demands on one or more controllers, processors, or processing devices of the refrigerator appliance.

FIG. 4 depicts steps performed in a particular order for purpose of illustration and discussion. Those of ordinary skill in the art, using the disclosures provided herein, will understand that the steps of any of the methods disclosed herein can be modified, adapted, rearranged, omitted, or expanded in various ways without deviating from the scope of the present disclosure (except as otherwise described).

At 410, the method 400 includes receiving a purchase invoice. Generally, the purchase invoice may include data relating to one or more items purchased from a retailer, such as a sales receipt. As an example, the purchase invoice may include an item identifier of a purchased item. The item identifier may generally or specifically indicate the type or name of the purchased item (e.g., the type of food item). As another example, the purchase invoice may include a unit count of the purchased item. The purchased unit count may demarcate volume, mass, or discrete portions of the purchased item (e.g., the number of a particular food item). As yet another example, the purchase invoice may include a time or date stamp of a date of a purchase for a purchased item. Thus, the purchase invoice may include data indicating the time or day on which the item was purchased. As still another example, the purchase invoice may include customer identification data. Such customer identification data may be included in instances wherein a particular phone number, card, etc. of a corresponding user has been stored within a retailer's point of sale system and associated with a specific purchase.

For an illustrative example, the purchase invoice may include data that 3 Apples were purchased by Customer A on July 17, wherein "Apples" are the item identifier, "3" is the unit count, "User A" is the customer identification data, and "July 17" is the date stamp.

In some embodiments, the purchase invoice is received directly from a retailer. For instance, the purchase invoice may be transmitted to the refrigerator appliance from a retailer point of sale server. Optionally, the retailer point of sale server may, upon completion of a sale, be prompted to transmit the purchase invoice to the specific refrigerator appliance if, for instance, the user has previously associated her customer identification data with the refrigerator appliance at the retailer's point of sale system. Alternatively, the retailer point of sale server may be prompted to transmit the purchase invoice in response to the user scanning a barcode on a sales receipt at a camera of the refrigerator appliance. In alternative embodiments, the sales receipt may be directly scanned by a camera of the refrigerator appliance and one or more character recognition sequences may be initiated, as would be understood, in order to interpret the text of the sales receipt (e.g., within the controller of the refrigerator appliance). The text of the sales receipt may thus be recognized and interpreted such that the controller can record (e.g., temporarily) each purchased item detailed in the sales receipt.

Separate from or in addition to the purchase invoice, supplemental data relating to items in the purchase invoice may be received. In some embodiments, stocking data for items in the purchase invoice may be received from a stock management server. The stocking data may include, for instance, expiration data (e.g., an anticipated expiration date, emergency recall information, etc.) or location data (e.g., relating to the manufacture, supplier, or retailer).

At 420, the method 400 includes initiating an item recognition sequence within the refrigerator appliance. Generally, the item recognition sequence may include capturing or measuring characteristics of one or more stored items in or near the refrigerator appliance. For instance, the item recognition sequence may include initiating an image capture sequence (e.g., first image capture sequence) at the camera module, as described above. The first image capture sequence may include capturing a plurality of two-dimensional images (e.g., a first two-dimensional image, subsequent second two-dimensional image, etc.), such as within a video feed or a series of sequential static images (e.g., taken or captured according to a predetermined rate or condition). Upon being captured at the camera module, the two-dimensional images may be transmitted to the controller (e.g., as a data signal). The two-dimensional images may then be recorded (e.g., temporarily) for comparison or evaluation.

In optional embodiments, 420 is contingent on identifying a specific user. Recording or evaluating two-dimensional images from the camera module may be prevented until the specific user is identified. The identification of a particular user may include receiving a user-detection signal indicating a biometric or personalized marker corresponding to the specific individual user, as described above. As an example, the user-detection signal may include a captured two-dimensional image of the specific user's face. From the captured two-dimensional image, the user may be recognized. As another example, the user-detection signal may include a fingerprint image from which the specific user's fingerprint may be recognized. As yet another example, the user-detection signal may include a detected device address of the specific user's mobile display (e.g., detected over a wireless communications band, such as, a BLE band using short-wavelength UHF radio waves in the ISM band from 2.4 to 2.485 GHz).

In additional or alternative embodiments, 420 is initiated in response to detecting movement (e.g., at the camera module within the refrigerator appliance). Thus, recording or evaluating two-dimensional images from the camera module may be prevented until movement is detected. As an example, movement may be detected at the camera module directed at the chilled chamber. Specifically, changes in light or pixels captured by the camera module may be detected (e.g., between multiple images captured over time) indicating the movement of one or more objects within the field of view of the camera module, as is generally understood.

Optionally, the item recognition sequence (e.g., first image capture sequence) may continue until one or more end conditions are met. As an example, an end condition may include expiration of a predetermined time period (e.g., span of time) following the start of a corresponding detection of movement. As another example, an end condition may include failure to detect further changes in sequential images of the first image capture sequence. In other words, the first image capture sequence may end after sequential images stop changing or detecting further movement. The end condition may specifically require a preset number or time period of unchanged sequential images. As yet another example, an end condition may include detecting closure of the door to the chilled chamber. In other words, the first image capture sequence may end in response to the door being moved to the closed position.

At 430, the method 400 includes generating an initial recognition attempt of a first stored item based on the item recognition sequence at 420. The attempt may include attempted recognition of the first stored item based on a first two-dimensional image of the first image capture sequence. In other words, using at least one two-dimensional image of the image capture sequence, a first stored item (e.g., food item) may be recognized. The attempted recognition may require the first stored item to pass beneath or within the field of view of the camera module, as described above. Thus, the first two-dimensional image may include at least a captured portion of the first stored item. Moreover, once captured, recognizing or identifying the first stored item may be performed by edge matching, divide-and-conquer search, greyscale matching, histograms of receptive field responses, or another suitable routine.

Optionally, the initial recognition attempt may include an estimated identifier for the first stored item. The estimated identifier may generally or specifically indicate the type or name of the first stored item (e.g., the type of food item). In other words, the initial recognition attempt may attempt to name what type of food item is recognized at 430. Additionally or alternatively, the initial recognition attempt may include an estimated unit count the first stored item. The estimated unit count may demarcate volume, mass, or discrete portions of the purchased item (e.g., the number of a particular food item). In other words, the initial recognition attempt may attempt to measure or number how much/many of a food item is recognized at 430. Optionally, the initial recognition attempt may include multiple possible objects that correspond to the first stored item.

In certain embodiments, the initial recognition attempt may be assigned a recognition score. The recognition score may correspond to a probability (e.g., percentage) that the first stored item has been correctly recognized. In other words, the recognition score may assign a value to the likelihood that the first stored item is a specific recognizable object. Optionally, the initial recognition may assign multiple discrete recognition scores to the first item—each recognition score corresponding to a different recognizable object. For an illustrative example, a recognition score of 90% for Object I may be assigned to indicate that there is a 90% probability that the first stored item is recognizable Object I, a recognition score of 70% for Object II may be assigned to indicate that there is a 70% probability that the first stored item is recognizable Object II, etc.

At 440, the method 400 includes comparing the initial recognition attempt of the first stored item to the purchase invoice. The comparison may seek to correlate or link the initial recognition attempt to an entry in the purchase invoice. For instance, the comparison may match one or more possible objects (e.g., estimated identifiers, estimated unit counts, etc.) from 430 to one or more entries (e.g., purchased item identifiers, purchased unit counts, etc.) in the purchase invoice.

In optional embodiments, 440 includes selecting the purchase invoice for comparison based on the date stamp or customer identification data. As an example, the purchase invoice may be selected from a plurality of invoices based on the date stamp. In certain embodiments, the date stamp of the purchase invoice is selected based on being the most recent purchase invoice. As an additional or alternative example, the purchase invoice may be selected from a plurality of invoices based on the customer identification data. In some embodiments, the customer data is matched to a specific user that has been previously identified by the appliance, as described above.

At 450, the method 400 includes generating a modified recognition attempt of the first stored item based on the comparison at 440. In particular, the initial recognition attempt may be updated according to the comparison. For instance, if a recognition score is generated at 430, the score may be altered based on whether one or more recognizable objects were matched in the purchase invoice. If a recognizable object from 440 is matched (e.g., found) in the purchase invoice, the recognition score may be increased, indicating that it is more likely that the first stored item is the estimated identifier or that the estimated unit count is correct. By contrast, if a recognizable object from 440 is not matched (e.g., found) in the purchase invoice, the recognition score may be decreased, indicating that it is less likely that the first stored item is the estimated identifier or that the estimated unit count is correct. If multiple possible objects are included with the initial recognition attempt, 440 may include discarding or demoting any possible objects that are not matched to a corresponding entry in the purchase invoice.

In optional embodiments, the method 400 includes requesting user confirmation of the modified recognition attempt. For instance, the appliance may generate a visual or audible query (e.g., via the communications assembly) asking the user whether the modified recognition attempt (e.g., the object with the highest recognition score) is correct. In response, a user may either confirm or deny that the modified recognition attempt, such as via a physical input or voice control, as is understood. In some such embodiments, the request for user confirmation is only initiated if the recognition score is determined to be below a predetermined threshold (e.g., 50%). Thus, in such embodiments, no request for user confirmation is generated if the recognition score is determined to be above the predetermined threshold.

At 460, the method 400 includes recording a descriptor of the first stored item to an inventory within the refrigerator appliance. In particular, the descriptor may be selected based on the modified recognition attempt (or confirmation thereof). Generally, the descriptor provides text or an image relating to the first stored item (e.g., as identified by the modified recognition attempt). Optionally, the descriptor may include the estimated identifier or estimated unit count. Additionally or alternatively, the descriptor may include stocking data (e.g., received from the stock management server), such as expiration data or location data.

In optional embodiments, recording the descriptor prompts an external search for information relating to the one or more purchased items. For instance, a search of one or more remote servers may be initiated using the descriptor. The search may be performed across the Internet or World Wide Web (e.g., using a known search engine). Alternatively, the search may be limited to one or more predetermined web addresses, websites, or servers. Generally, the search may represent a request for information regarding the stored item, such as descriptive information, handling information, or recipes in which the first item appears.

Once recorded, the inventory (including the descriptor of the first stored item) may be selectively recalled or viewed by a user at the integrated display or mobile display to review what stored items are currently within the appliance. After the first stored item is removed from the appliance, the appliance may update the inventory, for instance, automatically or in response to a manual user input, to remove the descriptor from the inventory. Additionally or alternatively, the appliance may automatically determine when the first stored item has expired (e.g., based on the stocking data) and generate an alert (e.g., audio or visual alert message) at the integrated display, the mobile display, or the communications assembly.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A refrigerator appliance comprising:
   a cabinet defining a chilled chamber;
   a door being rotatably hinged to the cabinet to provide selective access to the chilled chamber;
   a camera module mounted to the cabinet; and
   a controller operably coupled to the camera module, the controller being configured to initiate an operation routine comprising
      receiving a purchase invoice,
      initiating an item recognition sequence within the refrigerator appliance, initiating the item recognition sequence comprising initiating a first image capture sequence at the camera module,
      generating an initial recognition attempt of a first stored item based on the item recognition sequence,
      comparing the initial recognition attempt of the first stored item to the purchase invoice,
      generating a modified recognition attempt of the first stored item based on the comparison of the initial recognition attempt the first stored item to the purchase invoice, and
      recording a descriptor of the first stored item to an inventory within the refrigerator appliance,
   wherein generating the initial recognition attempt of the first stored item based on the item recognition sequence comprises assigning a recognition score for the first stored item based on a two-dimensional image of the first image capture sequence, and
   wherein generating the modified recognition attempt comprises altering the recognition score for the first stored item based on the purchase invoice.

2. The refrigerator appliance of claim 1, wherein the purchase invoice comprises an item identifier of a purchased item, wherein the initial recognition attempt and the modified recognition attempt comprise an estimated identifier of the first stored item.

3. The refrigerator appliance of claim 1, wherein the purchase invoice comprises a unit count of a purchased item, wherein the initial recognition attempt and the modified recognition attempt comprise an estimated unit count of the first stored item.

4. The refrigerator appliance of claim 1, wherein the purchase invoice comprises a date stamp of a date of purchase for a purchased item.

5. The refrigerator appliance of claim 1, wherein the purchase invoice is received from a retailer point of sale server.

6. The refrigerator appliance of claim 5, further comprising receiving expiration data relating to one or more purchased items.

7. The refrigerator appliance of claim 1, further comprising requesting user confirmation of the modified recognition attempt.

8. The refrigerator appliance of claim 1, wherein recording prompts an external search for information relating to one or more purchased items.

9. The refrigerator appliance of claim 1, wherein the camera module is mounted within a cabinet at a top portion of a chilled chamber
   wherein generating the initial recognition attempt of the first stored item based on the item recognition sequence includes identifying the first stored item based on the two-dimensional image of the first image capture sequence.

10. A method of operating a refrigerator appliance, the method comprising:
   receiving a purchase invoice;
   initiating an item recognition sequence within the refrigerator appliance, initiating the item recognition sequence comprising initiating a first image capture sequence at a camera module;
   generating an initial recognition attempt of a first stored item based on the item recognition sequence;
   comparing the initial recognition attempt of the first stored item to the purchase invoice;
   generating a modified recognition attempt of the first stored item based on the comparison of the initial recognition attempt the first stored item to the purchase invoice; and
   recording a descriptor of the first stored item to an inventory within the refrigerator appliance,
   wherein generating the initial recognition attempt of the first stored item based on the item recognition sequence comprises assigning a recognition score for the first stored item based on a two-dimensional image of the first image capture sequence, and
   wherein generating the modified recognition attempt comprises altering the recognition score for the first stored item based on the purchase invoice.

11. The method of claim 10, wherein the purchase invoice comprises an item identifier of a purchased item, wherein the initial recognition attempt and the modified recognition attempt comprise an estimated identifier of the first stored item.

12. The method of claim 10, wherein the purchase invoice comprises a unit count of a purchased item, wherein the initial recognition attempt and the modified recognition attempt comprise an estimated unit count of the first stored item.

13. The method of claim 10, wherein the purchase invoice comprises a date stamp of a date of purchase for a purchased item.

14. The method of claim 10, wherein the purchase invoice is received from a retailer point of sale server.

15. The method of claim 14, further comprising receiving expiration data relating to one or more purchased items.

16. The method of claim 10, further comprising requesting user confirmation of the modified recognition attempt.

17. The method of claim 10, wherein recording prompts an external search for information relating to one or more purchased items.

18. The method of claim 10, wherein the camera module is mounted within a cabinet at a top portion of a chilled chamber of the refrigerator appliance, and
   the initial recognition attempt of the first stored item based on the item recognition sequence includes identifying the first stored item based on the two-dimensional image of the first image capture sequence.

* * * * *